(12) United States Patent
Kikuchi et al.

(10) Patent No.: US 9,546,768 B2
(45) Date of Patent: Jan. 17, 2017

(54) VEHICLE HEADLAMP

(71) Applicant: KOITO MANUFACTURING CO., LTD., Tokyo (JP)

(72) Inventors: Hiroyuki Kikuchi, Shizuoka (JP); Teppei Muramatsu, Shizuoka (JP); Masayuki Kondo, Shizuoka (JP); Shigeru Kuwahara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 61 days.

(21) Appl. No.: 14/577,939

(22) Filed: Dec. 19, 2014

(65) Prior Publication Data
US 2015/0176795 A1     Jun. 25, 2015

(30) Foreign Application Priority Data

Dec. 20, 2013 (JP) ................................. 2013-264299
Sep. 11, 2014 (JP) ................................. 2014-185440

(51) Int. Cl.
| | |
|---|---|
| *F21S 8/10* | (2006.01) |
| *B60Q 1/076* | (2006.01) |
| *B60Q 1/10* | (2006.01) |
| *B60Q 1/12* | (2006.01) |

(52) U.S. Cl.
CPC ........... *F21S 48/1742* (2013.01); *B60Q 1/076* (2013.01); *B60Q 1/10* (2013.01); *B60Q 1/12* (2013.01); *F21S 48/321* (2013.01); *F21S 48/323* (2013.01); *F21S 48/325* (2013.01); *B60Q 2200/32* (2013.01)

(58) Field of Classification Search
CPC .... F21S 48/1742; B60Q 1/076; B60Q 1/0064; B60Q 1/11; B60Q 1/115; B60Q 2200/00; B60Q 2200/30; B60Q 2200/32; B60Q 2200/36; B60Q 2200/38
USPC ................................. 362/465, 467, 508, 512
See application file for complete search history.

(56) References Cited

U.S. PATENT DOCUMENTS

| | | | |
|---|---|---|---|
| 8,096,687 B2 | 1/2012 | Tajima | |
| 2005/0018437 A1* | 1/2005 | Hori ......................... | B60Q 1/12 362/465 |
| 2007/0147060 A1* | 6/2007 | Chen ...................... | B60Q 1/076 362/513 |

(Continued)

FOREIGN PATENT DOCUMENTS

| | | |
|---|---|---|
| JP | 2010-108869 A | 5/2010 |
| JP | 2013-020935 A | 1/2013 |

*Primary Examiner* — Renee Chavez
*Assistant Examiner* — Eric T Eide
(74) *Attorney, Agent, or Firm* — Osha Liang LLP

(57) ABSTRACT

A vehicle headlamp includes a lamp unit including a light source and being disposed inside a lamp outer casing, an actuator including a drive shaft and being detachable from a certain portion, a joint including a coupling portion and being detachable from the lamp unit, the coupling portion being coupled to the drive shaft in a state in which the joint is attached to the lamp unit. The lamp unit includes a plurality of unit configuration portions including the light source. The lamp unit is formed with a communication space which opens at least downward. At least one of the unit configuration portions can be removed at least downward through the communication space in a state in which the actuator has been detached from the certain portion and the joint has been detached from the lamp unit.

16 Claims, 14 Drawing Sheets

(56) References Cited

U.S. PATENT DOCUMENTS

| | | | |
|---|---|---|---|
| 2008/0089086 A1* | 4/2008 | Tajima | B60Q 1/076 362/524 |
| 2008/0225543 A1* | 9/2008 | Kuwahara | B60Q 1/0683 362/523 |
| 2010/0110709 A1* | 5/2010 | Tajima | B60Q 1/076 362/509 |
| 2010/0244649 A1* | 9/2010 | Inaba | F21K 9/00 313/46 |
| 2010/0253223 A1* | 10/2010 | Inoue | F21S 48/1159 315/82 |
| 2011/0222303 A1* | 9/2011 | Tokida | F21S 48/1154 362/516 |
| 2012/0140505 A1* | 6/2012 | Tsukamoto | F21S 48/1104 362/516 |

* cited by examiner

VEHICLE HEADLAMP

BACKGROUND OF INVENTION

CROSS-REFERENCE TO RELATED APPLICATION

The present application claims priorities from Japanese Patent Application No. 2013-264299 filed on Dec. 20, 2013 and Japanese Patent Application No. 2014-185440 filed on Sep. 11, 2014, the entire content of which is incorporated herein by reference.

FIELD OF INVENTION

The present invention relates to a vehicle headlamp including an actuator which swings a lamp unit to change the optical axis of a light source, and a joint with a coupling portion coupled to a drive shaft of the actuator.
Patent Document 1: JP-A-2010-108869
Patent Document 2: JP-A-2013-20935

RELATED ART

Among vehicle headlamps there is a type in which, for example, a lamp unit including a light source is disposed inside a lamp outer casing configured by a cover and a lamp housing, the lamp unit is swingably (tiltably) supported by the lamp housing through a support body such as a frame, and the lamp unit can swing with drive force from the actuator (see for example Patent Document 1).

In addition to the light source, such lamp units are configured by plural unit configuration portions, including, for example, a projection lens which illuminates light, a lens holder which holds the projection lens, a light source drive section such as a driver module including a light source drive control circuit, and a radiator fan which rotates when the light source is being driven (see for example Patent Document 1 and Patent Document 2).

In vehicle headlamps such as those described above, sometimes replacement or repair of unit configuration portions becomes necessary due to faults or deterioration in the unit configuration portions of the lamp unit. In such cases, it is necessary to remove the unit configuration portion in question. The vehicle headlamp described in Patent Document 2 is configured so as to allow removal of a driver module (light emitting module) from the rear during replacement or repair of unit configuration portions.

However, since various other structures, such as an actuator, are disposed inside the lamp outer casing in addition to the lamp unit, the placement positions of such other unit configuration portions might impede the removal operation of the unit configuration portion requiring replacement or repair.

Moreover, depending on the placement positions of unit configuration portions, it may be difficult to remove the unit configuration portions from the rear.

SUMMARY OF INVENTION

Exemplary embodiments provide a vehicle headlamp in which a removal operation of a unit configuration portion requiring replacement or repair can be performed smoothly, without the removal operation being obstructed by the placement positions of other structures.

A vehicle headlamp according to an exemplary embodiment of the invention, comprises:

a lamp unit including a light source and being disposed inside a lamp outer casing, the lamp outer casing including a lamp housing with an opening and a cover covering the opening of the lamp housing;

an actuator including a drive shaft and being detachable from a certain portion, the actuator being configured to impart drive force to the lamp unit to swing the lamp unit and change an optical axis of the light source;

a joint including a coupling portion and being detachable from the lamp unit, the coupling portion being coupled to the drive shaft in a state in which the joint is attached to the lamp unit, wherein:

the lamp unit includes a plurality of unit configuration portions including the light source, the lamp unit is formed with a communication space which opens at least downward, and at least one of the unit configuration portions can be removed at least downward through the communication space in a state in which the actuator has been detached from the certain portion and the joint has been detached from the lamp unit.

Accordingly, the specific unit configuration portion can be removed downward by detaching the actuator from the certain portion and detaching the joint from the lamp unit.

The vehicle headlamp may further comprise:

a frame including an actuator attachment portion which is the certain portion, the frame being configured to support the lamp unit so as to be capable of swinging, wherein:

the actuator attachment portion is formed in a frame shape including an insertion space pierced through in a up-down direction, the insertion space being below and in communication with the communication space, and said at least one of the unit configuration portions can be removed downward through the communication space and the insertion space.

Accordingly, both the lamp unit and the actuator are joined to the frame.

The vehicle headlamp may further comprise:

a driver module including a drive control circuit of the light source; and a radiator fan configured to rotate at least when the light source is being driven, wherein:

said at least one of the unit configuration portions is the driver module and the radiator fan.

Accordingly, unit configuration portions with high replacement requirements can be removed.

The vehicle headlamp may further comprise:

a support member configured to rotatably support the radiator fan and attached to the driver module.

Accordingly, the driver module and the radiator fan can be removed at the same time.

The joint and the lamp unit may rotate together in accordance with rotation of the drive shaft, the joint may have a stopper-contact portion, and the frame may have a stopper positioned to the outside of the insertion space and configured to restrict rotation of the lamp unit by contacting the stopper-contact portion during rotation of the joint.

Accordingly, the stopper does not get in the way of the unit configuration portion during removal of the unit configuration portion.

According to the exemplary embodiments of the invention, the specific unit configuration portion can be removed downward by detaching the actuator from the certain portion, and detaching the joint from the lamp unit, such that a removal operation of a unit configuration portion requiring replacement or repair can be performed smoothly, without the removal operation being obstructed by the placement positions of other structures.

DETAILED DESCRIPTION

Explanation follows regarding an embodiment of a vehicle headlamp of the invention, with reference to the attached drawings.

Vehicle headlamps 1 are attached to both left and right ends of a front end section of a vehicle.

Figure 1:
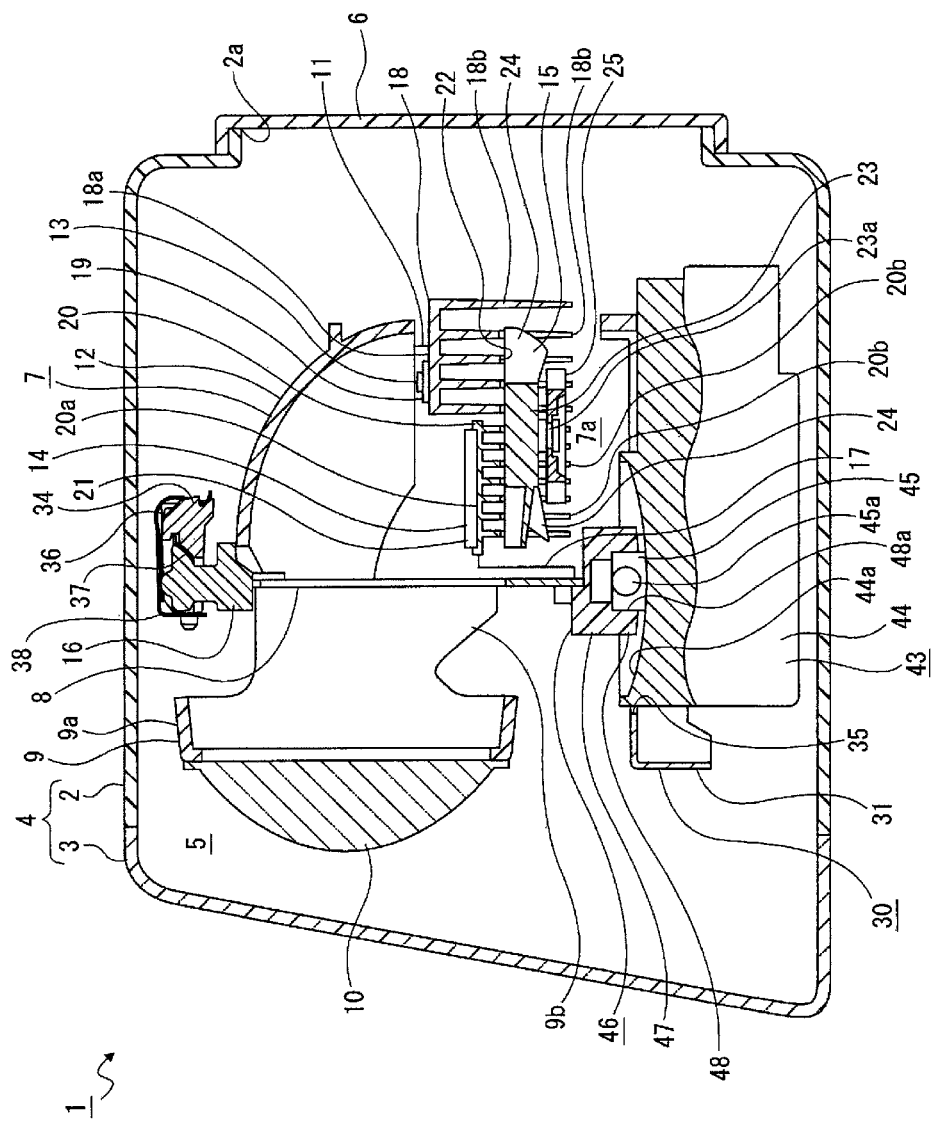
FIG. 1 is a schematic vertical cross-section illustrating a vehicle headlamp according to an embodiment of the invention.

As illustrated in FIG. 1, the vehicle headlamp 1 includes a lamp housing 2 with a recess open toward the front, and a cover 3 which closes off the opening of the lamp housing 2. The lamp housing 2 and the cover 3 configure a lamp outer casing 4, and a lamp chamber 5 is configured in a space inside the lamp outer casing 4.

An attachment opening 2a is formed penetrating a rear end portion of the lamp housing 2 from front to rear. A back cover 6 is attached to the rear end portion of the lamp housing 2 to cover the attachment opening 2a.

Figure 2:
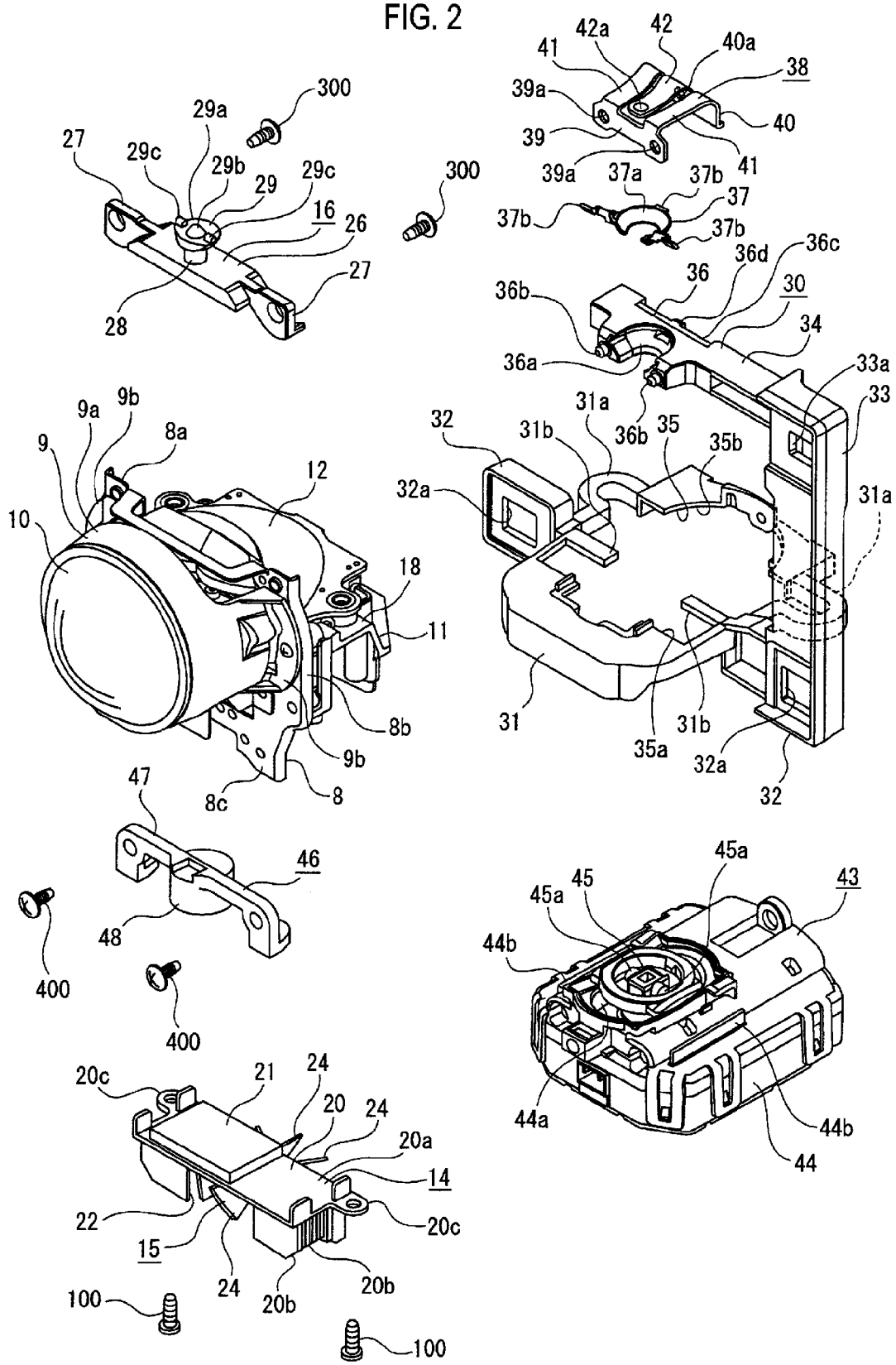
FIG. 2 is an exploded perspective view illustrating a lamp unit, etc.
Figure 3:
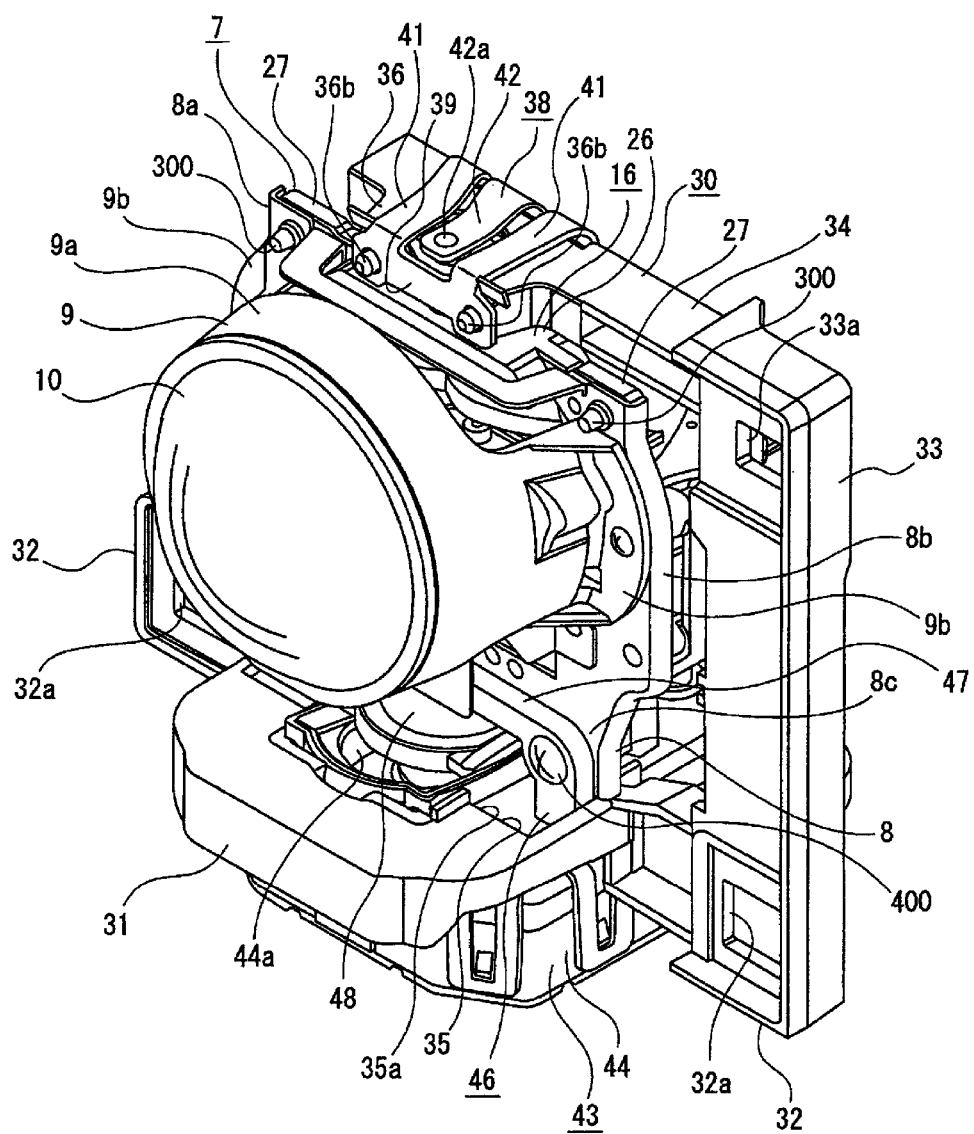
FIG. 3 is a perspective view illustrating the lamp unit, etc.

A lamp unit 7 is disposed inside the lamp chamber 5 (see FIG. 1 to FIG. 3). The lamp unit 7 is configured by plural unit configuration portions. The respective unit configuration portions include an attachment plate 8, a lens holder 9, a projection lens 10, a mounting base 11, a reflector 12, a light source 13, a driver module 14, a radiator fan 15, and a coupling member 16.

The attachment plate 8 is formed in a substantially plate shape facing in the front-rear direction, and is configured in a frame shape. The attachment plate 8 functions as a fixed shade which blocks a portion of the light emitted from the light source 13. An upper end portion of the attachment plate 8 is provided as a first attachment portion 8a, both left and right end portions of the attachment plate 8 are provided as second attachment portions 8b, 8b, and a lower end portion is provided as a third attachment portion 8c.

The lens holder 9 includes a circular cylinder shaped cylinder portion 9a, and coupling legs 9b, 9b projecting out toward the rear from both left and right side portions of the cylinder portion 9a. The coupling legs 9b, 9b of the lens holder 9 are attached to the second attachment portions 8b, 8b of the attachment plate 8 by screw fixing or the like.

The projection lens 10 is formed in a substantially hemispherical shape projecting toward the front, and is held in the lens holder 9 by attaching a rear end portion of the projection lens 10 to a front end portion of the cylinder portion 9a.

The mounting base 11 is positioned to the rear side of the attachment plate 8. A front end portion of the mounting base 11 is provided with an attached portion 17, and a rear end portion is provided with a mounting portion 18 (see FIG. 1). The attached portion 17 of the mounting base 11 is attached to a rear face of the attachment plate 8.

The mounting portion 18 includes a light source installation face 18a facing in the up-down direction, and radiator fins 18b, 18b . . . projecting downward from the light source installation face 18a. Notches are formed in the radiator fins 18b, 18b.

The light source 13 is installed on the light source installation face 18a of the mounting portion 18 with a circuit board 19 interposed therebetween. A light emitting diode (LED), for example, is employed as the light source 13.

The driver module 14 includes a mounting block 20 and a drive control circuit 21 disposed on an upper face of the mounting block 20 (see FIG. 1 and FIG. 2). The mounting block 20 is formed in a laterally elongated shape, and is configured by a circuit installation face 20a facing in the up-down direction, radiator fins 20b, 20b projecting downward from the circuit installation face 20a, and attachment tabs 20c, 20c projecting out to the sides (outward) from both the left and right ends of the circuit installation face 20a. Notches are formed in the radiator fins 20b, 20b.

The drive control circuit 21 has a function to control on-off switching of the light source 13, and is electrically connected to the light source 13 by a connection cord, not illustrated.

The attachment tabs 20c, 20c of the driver module 14 are attached to a lower face of the mounting base 11 from below, using attachment screws 100, 100. In the attached state of the driver module 14 to the mounting base 11, the notches formed to the radiator fins 20b, 20b of the driver module 14, and the notches formed to the radiator fins 18b, 18b of the mounting base 11, form a downward opening mounting recess 22 (see FIG. 1).

Figure 5:
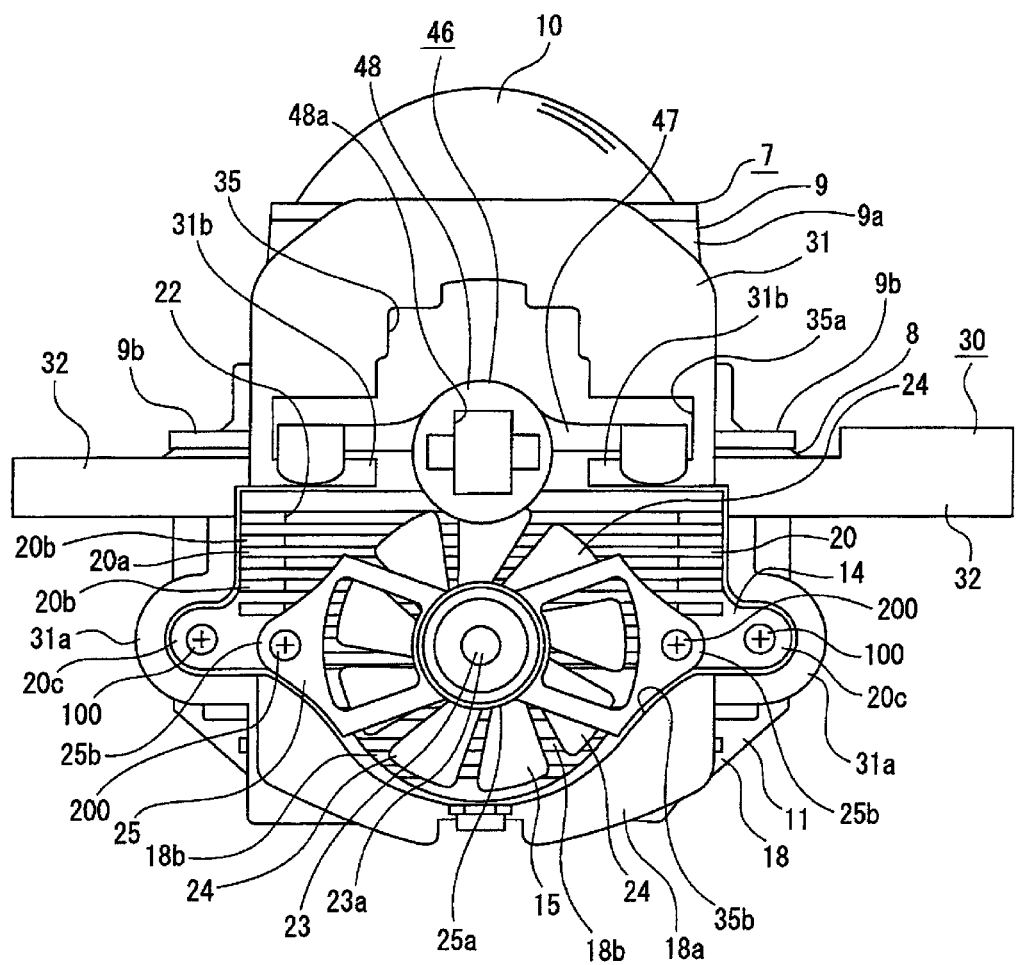
FIG. 5 is a bottom face view of a lamp unit, etc., illustrating a state in which an actuator has been detached.

The radiator fan 15 includes a shaft 23 and blades 24, 24 projecting out from an outer peripheral face of the shaft 23. A supported shaft portion 23a is provided projecting downward from the axial center of the shaft 23 (see FIG. 1 and FIG. 5).

The radiator fan 15 is mounted in the mounting recess 22 by a support member 25. The support member 25 is configured by a circular ring shaped support portion 25a, and joining portions 25b, 25b projecting out to the left and right from the support portion 25a. The supported shaft portion 23a of the radiator fan 15 is inserted into the circular ring shaped support portion 25a from above, so as to be rotatably supported by the support member 25.

The joining portions 25b, 25b of the support member 25 are attached to a lower face of the mounting block 20 of the driver module 14 from below using, screw members 200, 200.

In a state in which the driver module 14 is attached to the mounting base 11, and the radiator fan 15 is attached to the driver module 14 as described above, a communication space 7a, where other unit configuration portions of the lamp unit 7 are not present, is formed in the lamp unit 7 below the driver module 14 and the radiator fan 15 (see FIG. 1).

The coupling member 16 is formed in a laterally elongated shape, and, as illustrated in FIG. 2, includes a base 26, fastening portions 27, 27 respectively projecting out to the sides (outward) from both left and right ends of the base 26, a shaft 28 projecting out upward from the base 26, and a supported portion 29 provided contiguous to an upper end of the shaft 28.

The supported portion 29 is configured by a sliding portion 29a formed in a downward protruding, substantially hemispherical shape, a pressed projection 29b projecting out upward from the sliding portion 29a, and restricted projections 29c, 29c projecting out upward from the sliding portion 29a. The pressed projection 29b is formed in an upward protruding, substantially hemispherical shape, and the restricted projections 29c, 29c are positioned to the left and right of the pressed projection 29b.

The fastening portions 27, 27 of the coupling member 16 are attached to the first attachment portion 8a of the attachment plate 8 using screws 300, 300. Note that the coupling member 16 may be integrally formed to the attachment plate 8.

A movable shade, and a shade drive mechanism for operating the movable shade, neither of which are illustrated in the drawings, are disposed between the attachment plate 8 and the light source 13. When the shade drive mechanism operates the movable shade, the amount of light emitted from the light source 13 which is blocked changes, for example to switch between high beam and low beam light distribution patterns.

The lamp unit 7 configured as described above is suspended from a frame 30 so as to be swingably (tiltably) supported (see FIG. 1 to FIG. 4).

The frame 30 is configured by a frame shaped actuator attachment portion 31 which is pierced from top to bottom, coupling portions 32, 32 projecting out to the sides (outward) from both left and right side faces of the actuator attachment portion 31, a columnar portion 33 projecting out upward from one of the coupling portions 32, and a support 34 projecting out to the side from an upper end portion of the columnar portion 33.

The actuator attachment portion 31 is provided with U-shaped projections 31a, 31a projecting outward in the left and right directions at positions toward the rear end of the actuator attachment portion 31. The actuator attachment portion 31 is also provided with projections 31b, 31b projecting out toward each other along the left-right direction. The actuator attachment portion 31 is also provided with plural attachment projections at respective specific positions.

A space inside the actuator attachment portion 31 forms an insertion space 35. The insertion space 35 is formed with a laterally elongated first removal portion 35a at a portion to the front side of the projections 31b, 31b, and a second removal portion 35b larger than the first removal portion 35a at a portion to the rear side of the projections 31b, 31b. The second removal portion 35b is below and in communication with the communication space 7a of the lamp unit 7.

Nut coupling holes 32a, 32a are formed penetrating the respective coupling portions 32, 32 from front to rear. Not illustrated nut members are coupled to the nut coupling holes 32a, 32a in a state permitting up-down and left-right displacement with respect to the coupling portions 32, 32, and screw fastening portions of not illustrated aiming screws are screwed into the nut members. A portion toward the rear end of each of the aiming screws is supported by a rear face of the lamp housing 2 in a state incapable of front-rear direction movement, but rotatable in an axial peripheral direction.

A pivot coupling hole 33a is formed penetrating an upper end portion of the columnar portion 33 from front to rear. A not illustrated pivot member is coupled to the pivot coupling hole 33a, and the pivot member is supported at the rear face of the lamp housing 2 so as to be capable of swinging in a desired direction.

The support 34 is positioned directly above the actuator attachment portion 31, and includes a support portion 36 open toward the front. An inner face of the support portion 36 forms a bowl shaped bearing face 36a heading outward on progression upward.

Insertion projections 36b, 36b are provided projecting out toward the front at both left and right sides of the bearing face 36a at a front face of the support portion 36. An upper end portion of a rear end portion of the support portion 36 forms an inclined face 36c, and a temporary holding projection 36d is provided to the inclined face 36c. The inclined face 36c is formed in a sloping orientation facing upward toward the rear. An anchor projection 36e is provided at a rear face of the support portion 36. The anchor projection 36e includes an inclined face inclined downward toward the rear, and a downward facing anchor face. The lower edge of the inclined face is contiguous to the rear edge of the anchor face.

A shaft bearing washer 37 is retained in the support portion 36. The shaft bearing washer 37 is integrally formed from, for example, a metal material with good sliding characteristics, and includes a slide support portion 37a formed with a similar bowl shape to the bearing face 36a, and retention tabs 37b, 37b, 37b respectively projecting out to the left, right, and rear from the slide support portion 37a. The slide support portion 37a of the shaft bearing washer 37 is mounted on the bearing face 36a, and the retention tabs 37b, 37h, 37b respectively engage with respective specific portions of the support portion 36 so as to be retained in the support portion 36.

The lamp unit 7 is supported by the frame 30 so as to be capable of swinging by inserting the supported portion 29 of the coupling member 16 into the support portion 36 from the front side, in a retained state of the shaft bearing washer 37 in the support portion 36. The sliding portion 29a of the supported portion 29 is mounted on the slide support portion 37a of the shaft bearing washer 37, and is capable of sliding with respect to the slide support portion 37a (see FIG. 4).

A holding spring 38 is attached to the support portion 36 (see FIG. 1 and FIG. 4), and the holding spring 38 prevents the supported portion 29 from coming out of the support portion 36.

The holding spring 38 is integrally formed with a laterally elongated joining face 39 facing in the front-rear direction, a laterally elongated anchor face 40 facing in the front-rear direction at a position to the rear side of the joining face 39, coupling faces 41, 41 which couple together the joining face 39 and the anchor face 40, and a spring face 42 projecting out substantially toward the front from an upper edge of the anchor face 40.

The joining face 39 is formed with insertion holes 39a, 39a at a left-right separation to each other. An anchor hole 40a is formed at a left-right direction central portion of the anchor face 40. The coupling faces 41, 41 are at a left-right separation to each other, and couple together both left and right end portions of the joining face 39 and the anchor face 40 at upper end portions thereof. The spring face 42 is positioned between the coupling faces 41, 41 in a state positioned across a specific gap from the joining face 39 and the coupling faces 41, 41. The up-down direction position of the spring face 42 is set lower than the up-down direction position of the coupling faces 41, 41.

The length of the spring face 42 in the front-rear direction is set longer than the width (up-down direction length) of the joining face 39 and the width (up-down direction length) of the anchor face 40, and a pressing portion 42a which presses the pressed projection 29b of the coupling member 16 is provided to a leading end portion (front end portion) of the spring face 42. The pressing portion 42a is formed in an upward protruding substantially circular arc shape.

Figure 6:
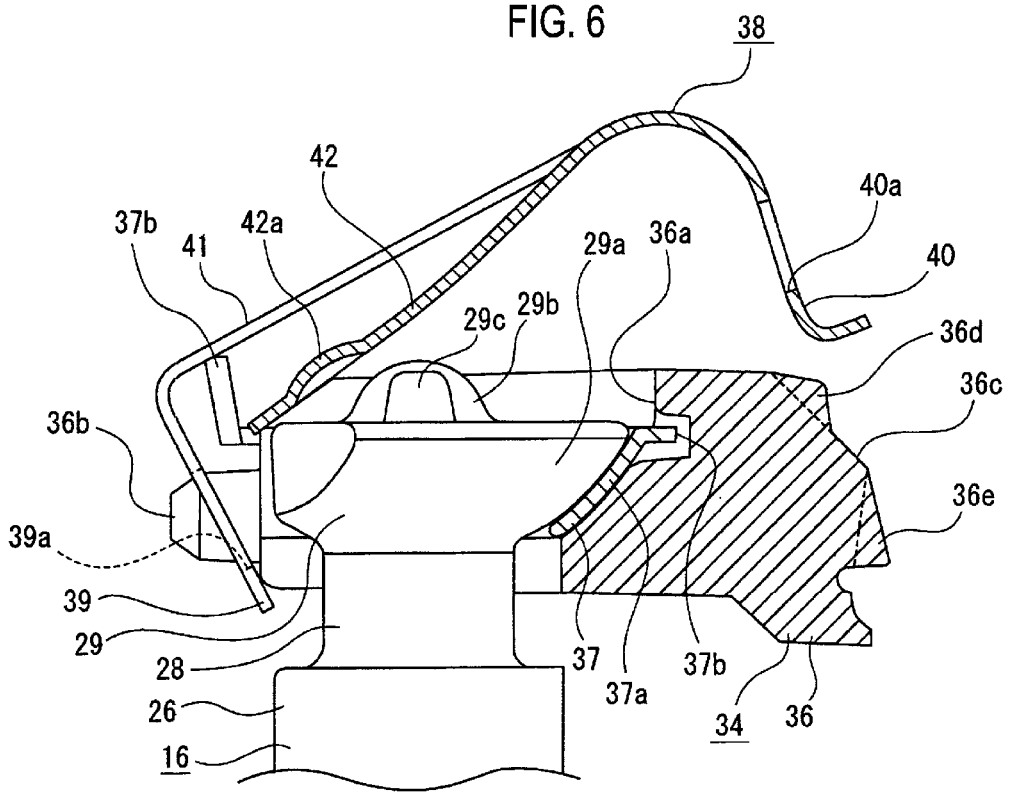
FIG. 6 is a schematic side view and partial cross-section illustrating a state in which the holding spring is inclined downward toward the front so as to insert an insertion projection of a support portion into an insertion hole in a joining face.
Figure 7:
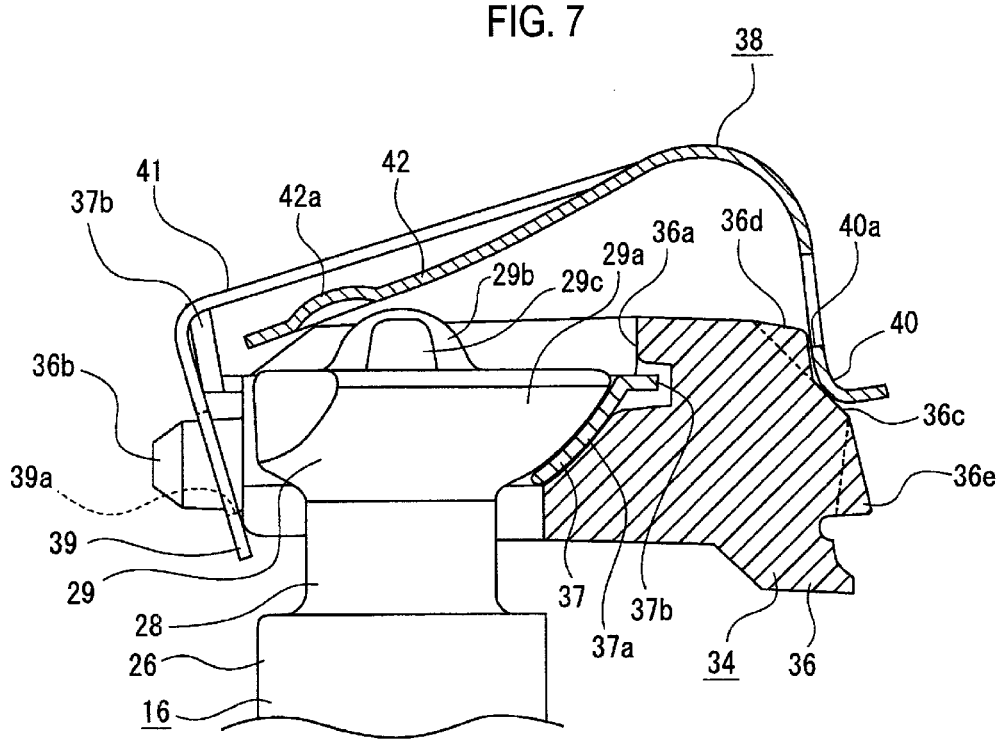
FIG. 7 is a schematic side view and partial cross-section illustrating a temporarily fastened state in which a lower end portion of an anchor face is engaged with a temporary holding projection of the support portion.
Figure 8:
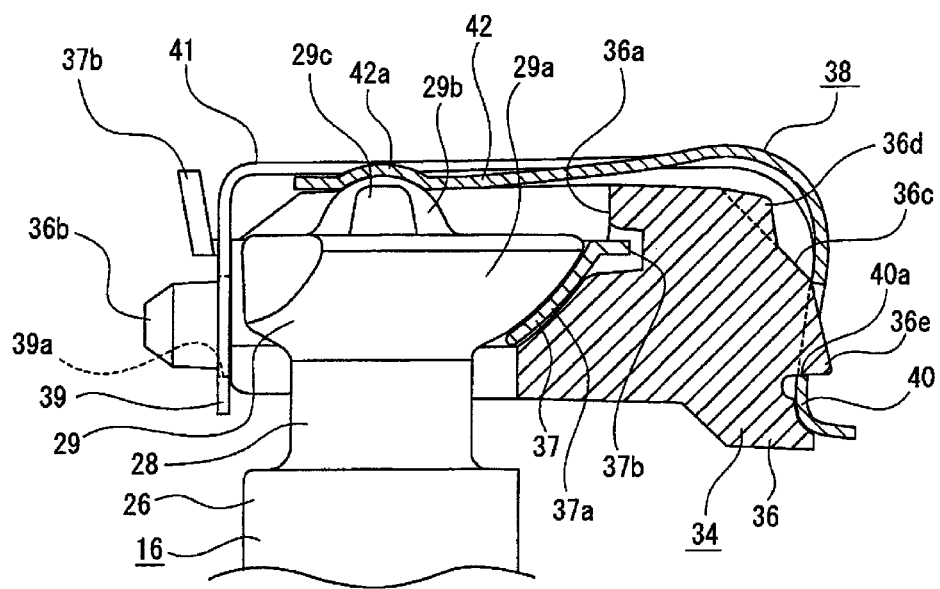
FIG. 8 is a schematic side view and partial cross-section illustrating an attached state of the holding spring to the support portion.

Explanation follows regarding an attachment procedure of the holding spring 38 to the support portion 36 of the frame 30 (see FIG. 6 to FIG. 8).

The holding spring 38 is attached to the support portion 36 in a state in which the shaft bearing washer 37 is retained in the support portion 36, the supported portion 29 is inserted into the support portion 36 from the front side, and the sliding portion 29a is mounted on the slide support portion 37a of the shaft bearing washer 37.

First, the holding spring 38 is assembled to the support portion 36 in an orientation sloping downward toward the front, such that the respective insertion projections 36b, 36b of the support portion 36 are inserted into the insertion holes 39a, 39a of the joining face 39 (see FIG. 6).

Next, a lower end portion of the anchor face 40 of the holding spring 38 is placed in an engaged state with the temporary holding projection 36d of the support portion 36 from the rear (see FIG. 7). The anchor face 40 of the holding spring 38 undergoes slight resilient deformation with respect to the coupling faces 41, 41 at this stage, and the lower end portion of the anchor face 40 is pressed against the temporary holding projection 36d from the rear.

As described above, the insertion projections 36b, 36b are inserted into the respective insertion holes 39a, 39a of the joining face 39, and the lower end portion of the anchor face 40 presses against the temporary holding projection 36d from the rear, such that the holding spring 38 is in a temporarily held state with respect to the support portion 36. There is accordingly no need to hold the holding spring 38 in place against the support portion 36, either manually or with a jig, during the attachment operation of the holding spring 38 to the support portion 36, thereby enabling ease of operation when attaching the holding spring 38 to the support portion 36 to be improved.

Next, rear end portions of the coupling faces 41, 41 of the holding spring 38 are pressed downward. When the rear end portions of the coupling faces 41, 41 are pressed downward, the lower end portion of the anchor face 40 slides downward over the inclined face 36c of the support portion 36. With this downward movement, the anchor face 40 rides over the inclined face of the anchor projection 36e of the support portion 36 while undergoing resilient deformation, and then the anchor face 40 passes the anchor projection 36e and undergoes resilient recovery (see FIG. 8). Due to the anchor face 40 passing the anchor projection 36e and undergoing resilient recovery, the anchor projection 36e is inserted into the anchor hole 40a and anchors to the lower edge of the opening of the anchor hole 40a of the anchor face, thereby attaching the holding spring 38 to the support portion 36.

Attaching the holding spring 38 to the support portion 36 in this manner enables assembly of the holding spring 38 to the support portion 36 to be performed by inserting the insertion projections 36b, 36b into the respective insertion holes 39a, 39a of the joining face 39, engaging the lower end portion of the anchor face 40 with the temporary holding projection 36d, and pressing down the rear end portions of the coupling faces 41, 41 to anchor the anchor projection 36e to the lower edge of the opening of the anchor hole 40a. Screw fixing and adhesion operations and the like are thereby rendered unnecessary in the attachment operation of the holding spring 38 to the support portion 36, enabling an improvement in operation efficiency when attaching the holding spring 38 to the support portion 36.

Note that, for example, another method for attaching a holding spring to the support portion 36 is a method in which the overall holding spring, formed in a U shape open toward the rear, is positioned at the front side of the support portion 36, and the holding spring is then moved toward the rear. However, in such cases it would be necessary to make configuration such that the holding spring and an upper end portion of the cylinder portion 9a of the lens holder 9 do not get in the way of each other when positioning the holding spring at the front side of the support portion 36. Accordingly, in such cases, it would be necessary to position the support portion 36 above the cylinder portion 9a, or to provide a large space for positioning the holding spring 38 between the upper end portion of the cylinder portion 9a and the support portion 36, thus increasing the size of the lamp unit 7.

However in the vehicle headlamp 1, as described above, at the start of attachment of the holding spring 38 to the support portion 36, it is sufficient to incline the holding spring 38 in an orientation sloping downward toward the front so as to insert the insertion projections 36b into the respective insertion holes 39a, 39a of the joining face 39. It is accordingly possible to configure the upper end portion of the cylinder portion 9a and the support portion 36 at the same height as each other, and also possible to reduce the space between the upper end portion of the cylinder portion 9a and the support portion 36, enabling a reduction in size of the lamp unit 7.

Figure 4:
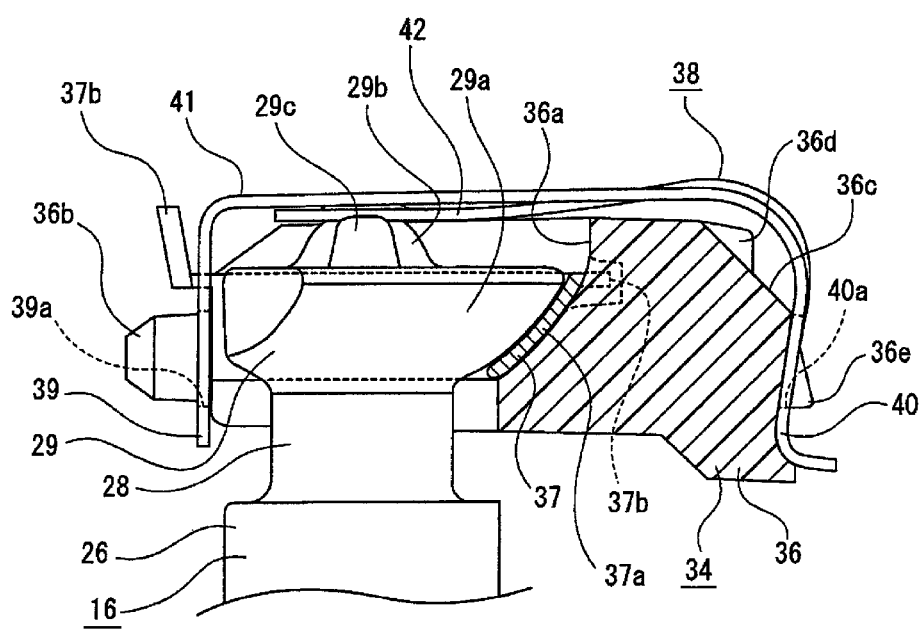
FIG. 4 is an enlarged side view and partial cross-section illustrating a state in which a supported member of a coupling member is pressed by a holding spring.

In the attached state of the holding spring 38 to the support portion 36, the spring face 42 undergoes resilient deformation so as to be displaced upwards, and the pressing portion 42a presses the pressed projection 29b of the coupling member 16 from above (see FIG. 4 and FIG. 8). Rattling and upward movement of the lamp unit 7 can be suppressed due to the pressing portion 42a pressing the pressed projection 29b from above.

In the attached state of the holding spring 38 to the support portion 36, the coupling faces 41, 41 are in a state positioned directly above the restricted projections 29c, 29c of the coupling member 16 across a small gap to the restricted projections 29c, 29c. Since the coupling faces 41, 41 are in a state across a small gap to the restricted projections 29c, 29c, the restricted projections 29c, 29c do not contact the coupling faces 41 when the lamp unit 7 swings with respect to the frame 30, enabling a smooth swinging operation of the lamp unit 7 with respect to the frame 30 to be secured.

Moreover, in the attached state of the holding spring 38 to the support portion 36, the spring face 42 is positioned at substantially the same height as the coupling faces 41, 41. The size of the holding spring 38 in the up-down direction can thereby be suppressed to a minimum, enabling a reduction in size of the lamp unit 7.

As described above, the coupling faces 41, 41 of the holding spring 38 are positioned directly above the restricted projections 29c, 29c, such that when, for example, upward movement force is imparted to the lamp unit 7 by vibration during vehicle travel or the like, the restricted projections 29c, 29c contact the coupling faces 41, 41, restricting excessive upward movement of the lamp unit 7. Accordingly, large displacement can be prevented in the lamp unit 7, enabling interference of light distribution and damage to the lamp unit 7 to be prevented, and the spring face 42 of the holding spring 38 can be suppressed from moving, enabling damage to the spring face 42 to be suppressed.

Since the coupling faces 41, 41 of the holding spring 38 suppress excessive displacement of the spring face 42, there is no need to provide the frame 30 with a pressing portion to press the spring face 42 from above in order to suppress excessive displacement of the spring face 42. Since there is no need to provide the frame 30 with a pressing portion to press the spring face 42 from above, the height of the lamp unit 7 can be lowered commensurately, enabling a reduction in size of the lamp unit 7 and the vehicle headlamp 1.

As described above, in the lamp unit 7, the length of the spring face 42 in the front-rear direction is set longer than the width (up-down direction length) of the joining face 39 and the width (up-down direction length) of the anchor face 40. The spring face 42 can accordingly be configured with sufficient length in the front-rear direction.

Accordingly, shifting of the load on the spring face 42 when the lamp unit 7 moves up and down can be kept small, enabling stable displacement operation to be secured for the spring face 42, and enabling an increased lifespan of the spring face 42.

As described above, in the attached state of the holding spring 38 to the support portion 36, the lamp unit 7 is capable of swinging in the left-right direction and the up-down direction with respect to the frame 30 in a state pressed by the spring face 42 of the holding spring 38. When the lamp unit 7 swings with respect to the frame 30, the sliding portion 29a of the supported portion 29 of the coupling member 16 slides over the slide support portion 37a of the shaft bearing washer 37 retained in the support portion 36.

Left-right aim adjustment of the lamp unit 7 is, for example, performed by rotating one of the aiming screws, or by rotating both of the aiming screws in opposite directions, to swing the lamp unit 7 together with the frame 30 about the pivot member in the left-right direction with respect to the lamp housing 2. Up-down aim adjustment of the lamp unit 7 is, for example, performed by rotating both of the aiming screws in the same direction to swing the lamp unit 7 together the frame 30 about the pivot member in the up-down direction with respect to the lamp housing 2.

An actuator 43 is attached to the actuator attachment portion 31 of the frame 30 (see FIG. 1 to FIG. 3). The actuator 43 is detachable from the actuator attachment portion 31.

The actuator 43 includes a case body 44, and a not illustrated drive mechanism disposed inside the case body 44.

An upper face of the case body 44 is formed with a not illustrated insertion hole penetrating in the up-down direction. The insertion hole is configured in a front-rear elongated shape. An upward opening recess shaped portion 44a is formed in communication with the insertion hole at an upper end of the case body 44. The recess shaped portion 44a is formed in a bowl shape along the front-rear direction (see FIG. 1). The upper face of the case body 44 is provided with stoppers 44b, 44b which project upwards and extend from front to rear at a left-right separation to each other.

The actuator 43 is provided with a drive shaft 45 which is moved in the front-rear direction and rotated by the drive mechanism. The drive shaft 45 projects through the insertion hole into the recess shaped portion 44a. Swing shafts 45a, 45a are provided projecting out to the left and right of the drive shaft 45.

The actuator 43 is attached to the actuator attachment portion 31 in a detachable state by sliding the actuator 43 in the front-rear direction with respect to the actuator attachment portion 31, such that each part of the actuator 43 engages with the respective attachment projections of the actuator attachment portion 31, in a contact state between an upper face of the actuator 43 and a lower face of the actuator attachment portion 31. The portion of the actuator 43 formed with the recess shaped portion 44a is inserted into the insertion space 35 in the attached state of the actuator 43 to the actuator attachment portion 31.

A joint 46 is attached to the third attachment portion 8c of the attachment plate 8 of the lamp unit 7. The joint 46 includes a joining arm 47 extending from left to right, and a coupling portion 48 provided contiguous to a lower face of a left-right direction central portion of the joining arm 47. The coupling portion 48 is formed with a downward opening coupling recess 48a (see FIG. 1 and FIG. 5).

The joining arm 47 of the joint 46 is attached to the third attachment portion 8c of the attachment plate 8 by fastening screws 400, 400 (see FIG. 2 and FIG. 3). In the attached state of the joint 46 to the attachment plate 8, a rear end portion of the coupling portion 48 is positioned directly below a front end portion of the driver module 14 and a front end portion of the radiator fan 15 (see FIG. 1 and FIG. 5).

In an attached state of the joint 46 to the attachment plate 8 of the lamp unit 7, the drive shaft 45 is inserted into the coupling recess 48a from below, thereby coupling the joint 46 to the actuator 43. Accordingly, when the drive shaft 45 rotates, the lamp unit 7 and the joint 46 swing together as a unit about the pressed projection 29b of the supported portion 29 of the coupling member 16, in the left-right direction with respect to the frame 30, to perform a swivel operation in which the optical axis changes to follow a direction corresponding to the direction of vehicle travel. When this is performed, a portion of the lamp unit 7 is capable of contacting the stoppers 44b, 44b provided to the actuator 43, with such contact with the stoppers 44b, 44b by a portion of the lamp unit 7, or a portion of the joint 46, restricting excessive swinging of the lamp unit 7.

When the drive shaft 45 moves in the front-rear direction, the lamp unit 7 and the joint 46 swing together as a unit about the pressed projection 29b of the supported portion 29 of the coupling member 16, in the up-down direction with respect to the frame 30, thereby performing levelling adjustment to adjust the direction of the optical axis to the correct direction when the optical axis changes due to cargo or the like in the vehicle. When this is performed, the joint 46 swings as a unit with the lamp unit 7 about the swing shafts 45a, 45a with respect to the drive shaft 45.

In the vehicle headlamp 1 configured as described above, it sometimes becomes necessary to replace or repair unit configuration portions due to faults or deterioration in the unit configuration portions of the lamp unit 7. In such cases, it is necessary to remove the unit configuration portion in question. Amongst the unit configuration portions, there is a particular likelihood of replacing or repairing the driver module 14 or the radiator fan 15.

Figure 9:
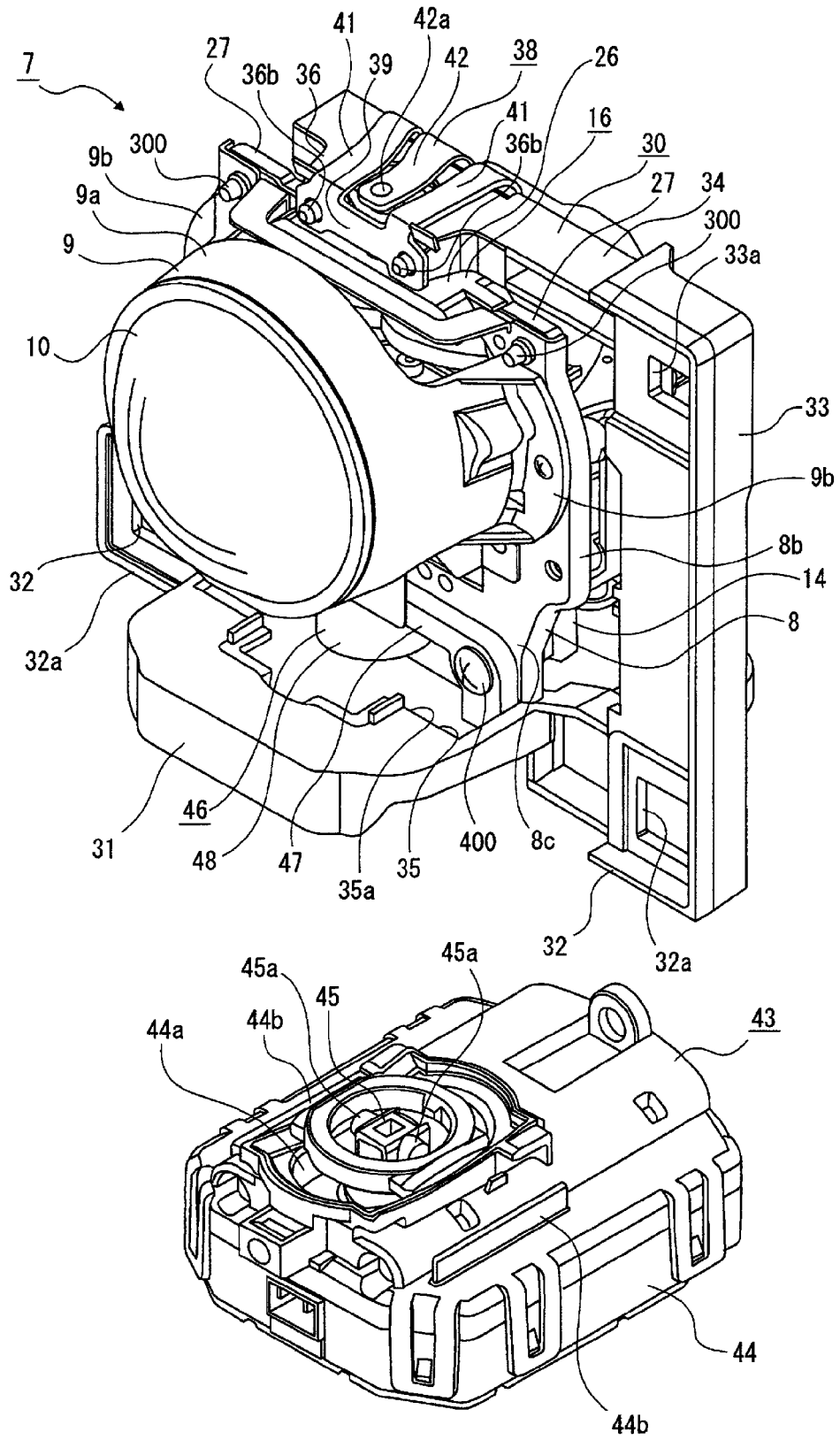
FIG. 9 is a perspective view illustrating a state in which an actuator has been detached from a frame.
Figure 10:
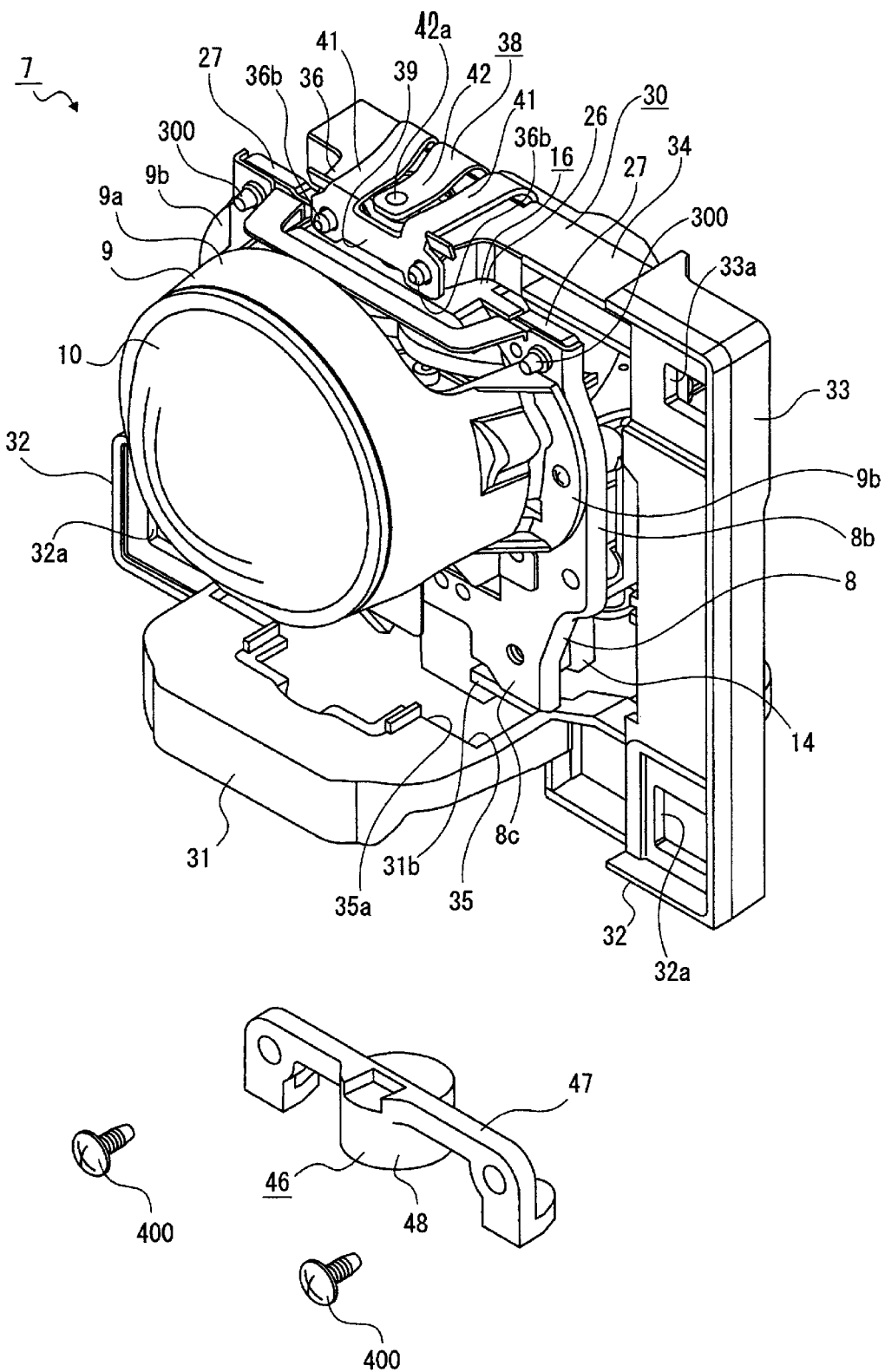
FIG. 10 is a perspective view illustrating a state in which a joint has been detached from a lamp unit.
Figure 11:
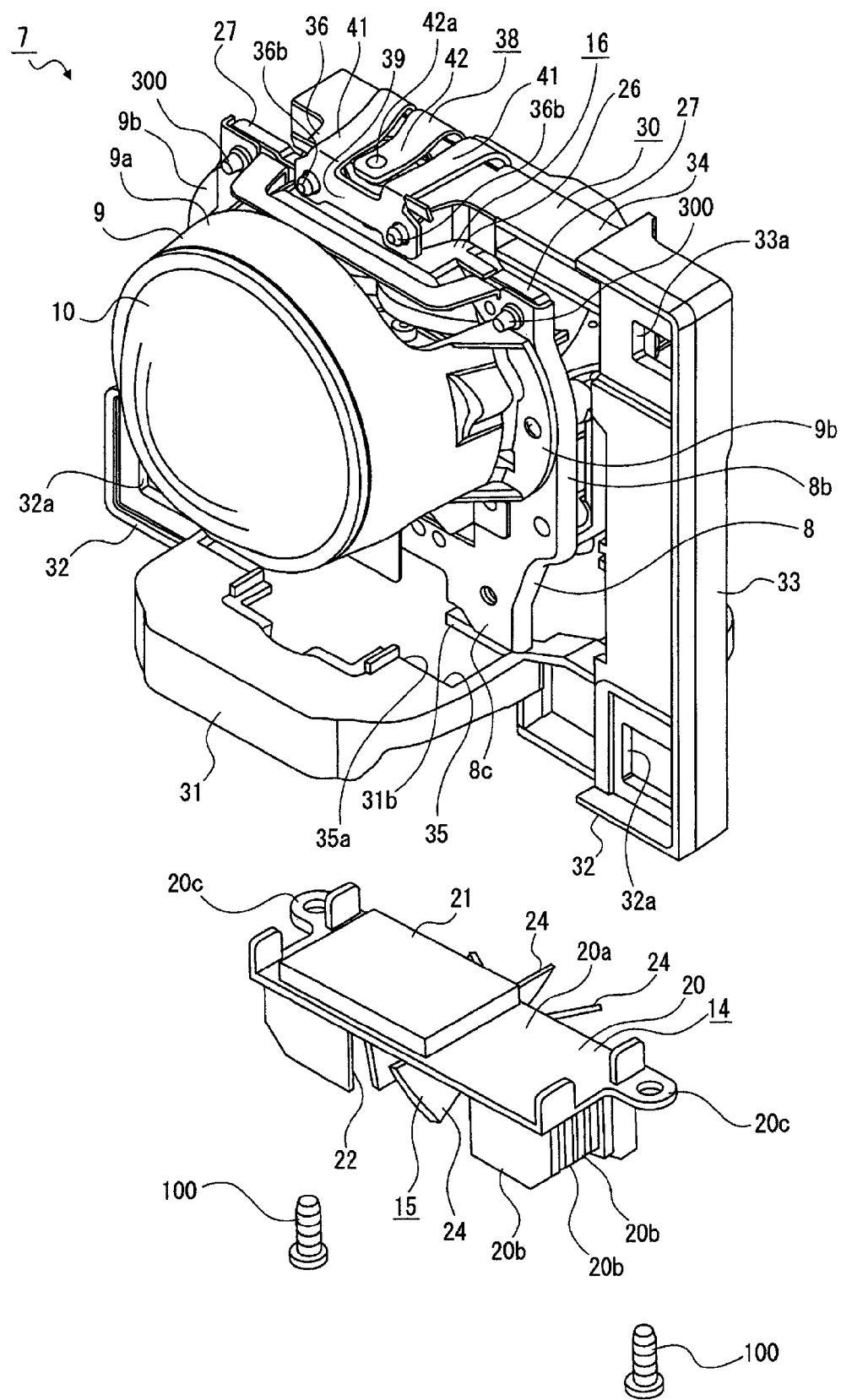
FIG. 11 is a perspective view illustrating a state in which a driver module and a radiator fan have been detached from a mounting base.

Explanation follows regarding a removal operation procedure of the driver module 14 and the radiator fan 15 (see FIG. 9 to FIG. 11).

First, a removal opening (removal hole) is formed in a bottom face of the lamp housing 2 using a cutter or the like. Note that, for example, the lamp housing 2 may be pre-formed with a removal opening, with the opening closed off by a cover, in which case the cover is removed to open the opening.

Next, the engaged state between the actuator 43 and the respective attachment projections of the actuator attachment portion 31 of the frame 30 is released by sliding the actuator 43 in the front-rear direction with respect to the actuator attachment portion 31, detaching the actuator 43 from the actuator attachment portion 31 (see FIG. 9). The detached actuator 43 is then removed to the outside (lower side) of the lamp outer casing 4 through the opening formed in the bottom face of the lamp housing 2.

Next, the fastening screws 400, 400 are loosened to detach the joint 46 from the attachment plate 8 (see FIG. 10), and the detached joint 46 is removed to the outside (lower side) of the lamp outer casing 4 through the opening portion in the lamp housing 2 together with the fastening screws 400, 400, using the first removal portion 35a of the insertion space 35.

Next, the attachment screws 100, 100 are loosened to detach the driver module 14 from the mounting base 11, together with the radiator fan 15 and the support member 25 (see FIG. 11). The detached driver module 14, radiator fan 15, and support member 25 are removed to the outside (lower side) of the lamp outer casing 4 through the opening in the lamp housing 2 together with the attachment screws 100, 100. When this is performed, the driver module 14, the radiator fan 15, and the support member 25 are moved through the communication space 7a toward the actuator attachment portion 31 side, and the attachment tabs 20c, 20c of the driver module 14 pass through the spaces formed inside the respective projections 31a, 31a, enabling removal of the driver module 14, the radiator fan 15, and the support member 25 by passing through the second removal portion 35b of the insertion space 35.

The driver module 14 and the radiator fan 15 whose replacement or repair has been completed are inserted inside the lamp outer casing 4 through the opening in the lamp housing 2, together with the support member 25, and attached in their original positions. Next, the joint 46 and the actuator 43 are inserted inside the lamp outer casing 4 through the opening in the lamp housing 2 and attached in their original positions in sequence.

In a completed state of attachment of the driver module 14, the radiator fan 15, the joint 46, and the actuator 43, a covering plate or the like is attached to the bottom face of the lamp housing 2, or the cover is attached, to close off the opening.

Note that as described above, in the vehicle headlamp 1 the stoppers 44b, 44b which restrict excessive swinging of the lamp unit 7 are provided to the actuator 43, rather than to the frame 30. The insertion space 35 can accordingly be formed with a large size, facilitating the passage of the joint 46, the driver module 14, the radiator fan 15, and the support member 25 through the insertion space 35.

An example has been given in which the driver module 14 and the radiator fan 15 are detached at the same time and removed to outside the lamp outer casing 4, however it is also possible to remove only the radiator fan 15. When removing only the radiator fan 15, in a detached state of the actuator 43 and the joint 46, the screws 200, 200 are loosened and the support member 25 is detached from the driver module 14, and the radiator fan 15 is removed from the opening of the lamp housing 2 together with the support member 25.

As described above, in the vehicle headlamp 1, the actuator 43 is detachable from the actuator attachment portion 31 of the frame 30, and the joint 46 is detachable from the attachment plate 8 of the lamp unit 7. In a state in which the actuator 43 has been detached from the actuator attachment portion 31 and the joint 46 has been detached from the attachment plate 8, unit configuration portions, for example the driver module 14 and the radiator fan 15, can be removed downwards through the communication space 7a.

Accordingly, a removal operation of unit configuration portions requiring replacement or repair can be performed smoothly, regardless of the installation positions of the actuator 43 and the joint 46, even in cases in which the unit configuration portions cannot be removed from the rear.

Both the lamp unit 7 and the actuator 43 are joined to the frame 30, and unit configuration portions can be removed downward through the communication space 7a and the insertion space 35 in a detached state of the actuator 43 from the actuator attachment portion 31, thereby enabling easy removal of unit configuration portions, as well as securing a simpler internal structure of the lamp outer casing 4.

Moreover, the removable unit configuration portions include the driver module 14 including the drive control circuit 21 of the light source 13, and the radiator fan 15 which rotates when the light source 13 is being driven, thus enabling easily detachment of unit configuration portions of the lamp unit 7 with high replacement requirements, enabling ease of maintenance to be improved.

Additionally, the radiator fan 15 is provided with the rotatably supported support member 25, and the support member 25 is attached to the driver module 14, thereby enabling removal of the driver module 14 in an attached state of the support member 25, which supports the radiator fan 15, to the driver module 14, enabling the driver module 14 and the radiator fan 15 to be removed at the same time, and enabling a quicker and easier removal operation.

Next, explanation follows regarding a frame 30A and a joint 46A of a modified example of the frame and the joint (see FIG. 12 to FIG. 15).

Note that in the following explanation, explanation is also given regarding structures other than the frame 30A and the joint 46A, such as a lamp unit and an actuator. However, although elements such as the lamp unit and the actuator described below include portions differing slightly in shape and size to the lamp unit 7, the actuator 43, etc., the basic structures thereof are the same as those of the lamp unit 7, the actuator 43, etc. Accordingly in the following explanation, with the exception of the frame 30A and the joint 46A, portions similar to those described above are allocated the same reference numerals, and explanation thereof is omitted.

Moreover, since only part of the shape and structure of the frame 30A and the joint 46A differ from the above-described frame 30 and joint 46, detailed explanation is only given regarding portions which differ from the frame 30 and the joint 46, and other portions are allocated the same reference numerals as similar portions in the frame 30 and the joint 46, and explanation thereof is omitted.

Figure 12:
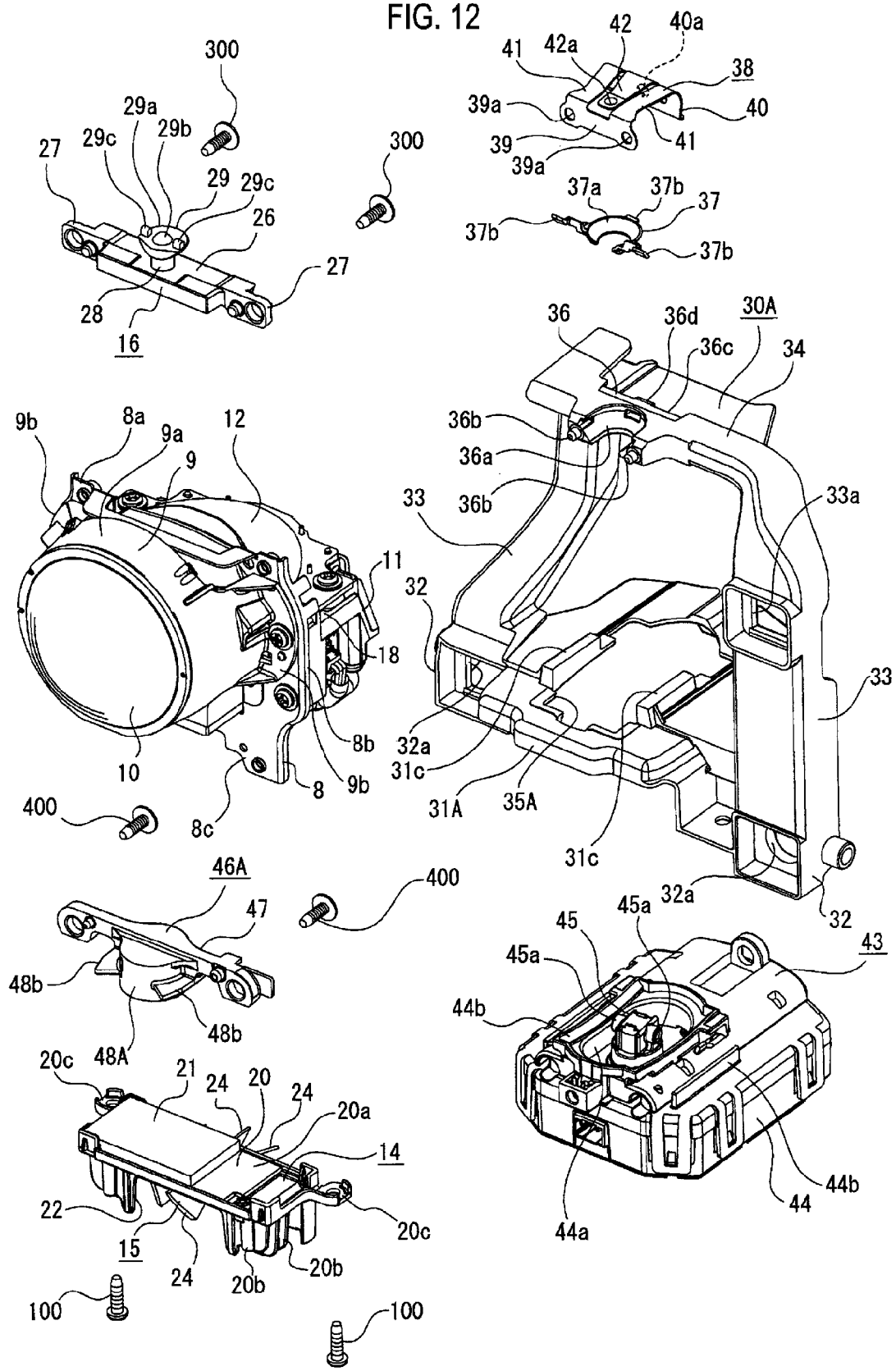
FIG. 12 is an exploded perspective view illustrating a modified example of a frame and a joint.
Figure 13:
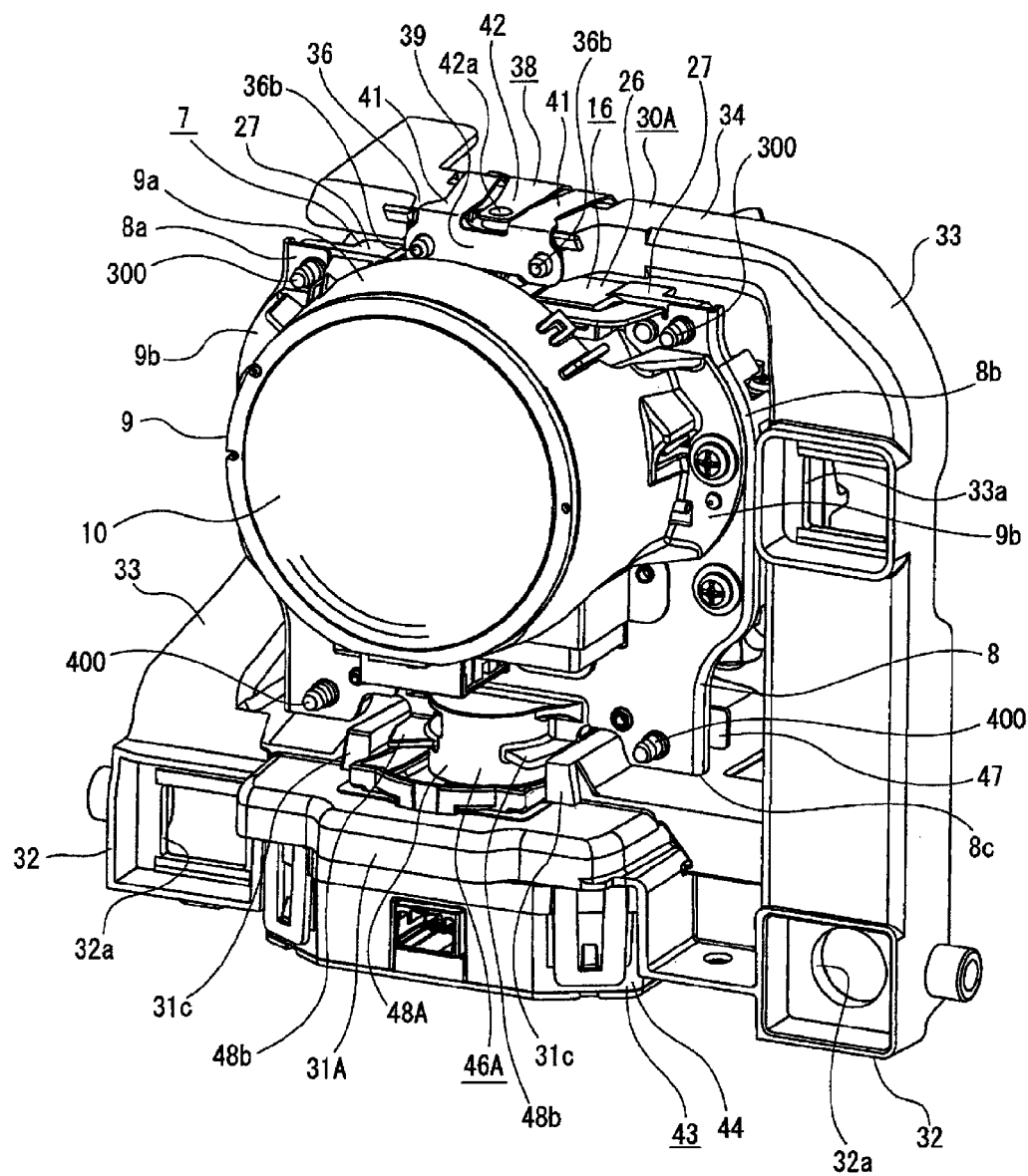
FIG. 13 is a perspective view illustrating the lamp unit, etc.

The lamp unit 7 is suspended from the frame 30A so as to be swingably (tiltably) supported (see FIG. 12 and FIG. 13).

The frame 30A is configured by a frame shaped actuator attachment portion 31A which is pierced from top to bottom, coupling portions 32, 32 projecting out to the sides (outward) from both left and right side faces of the actuator attachment portion 31A, columnar portions 33, 33 projecting out upward from the coupling portions 32, 32, and a support 34 coupled between upper end portions of the columnar portion 33, 33.

The actuator attachment portion 31A is provided with plural attachment projections at respective specific positions. A space inside the actuator attachment portion 31A forms an insertion space 35A. The insertion space 35A is formed in a substantially rectangular shape, slightly elongated lengthways.

The actuator attachment portion 31A is provided with respective stoppers 31c, 31c at opening edges on both left and right sides of the insertion space 35A. The stoppers 31c, 31c are accordingly positioned outside the insertion space 35A. The stoppers 31c, 31c project upward and are formed in a shape extending from front to rear.

A pivot coupling hole 33a is formed penetrating an up-down direction intermediate portion of one of the columnar portions 33 from front to rear.

The frame 30A is capable of swinging in the left-right direction and the up-down direction in a state in which the lamp unit 7 is pressed by the spring face 42 of the holding spring 38. The actuator 43 is attached to the actuator attachment portion 31A of the frame 30A, and the actuator 43 is detachable from the actuator attachment portion 31A.

The joint 46A is attached to the third attachment portion 8c of the attachment plate 8 of the lamp unit 7. The joint 46A includes a joining arm 47 extending from left to right, and a coupling portion 48A provided contiguous to a lower face of a left-right direction central portion of the joining arm 47.

The coupling portion 48A is formed with a downward opening coupling recess 48a. An outer peripheral face of the coupling portion 48A is provided with stopper-contact portions 48b, 48b at a left-right separation to each other. The stopper-contact portions 48b, 48b are formed in substantially circular arc shapes with a thin top-to-bottom thickness, and project out toward the sides.

In an attached state of the joint 46A to the attachment plate 8 of the lamp unit 7, the drive shaft 45 is inserted into the coupling recess 48a from below, thereby coupling the drive shaft 45 to the actuator 43. Accordingly, when the drive shaft 45 rotates, the lamp unit 7 and the joint 46A swing together as a unit about the pressed projection 29b of the supported portion 29 of the coupling member 16, in the left-right direction with respect to the frame 30A, thereby performing a swivel operation in which the optical axis changes to follow a direction corresponding to the direction of vehicle travel.

Figure 14:
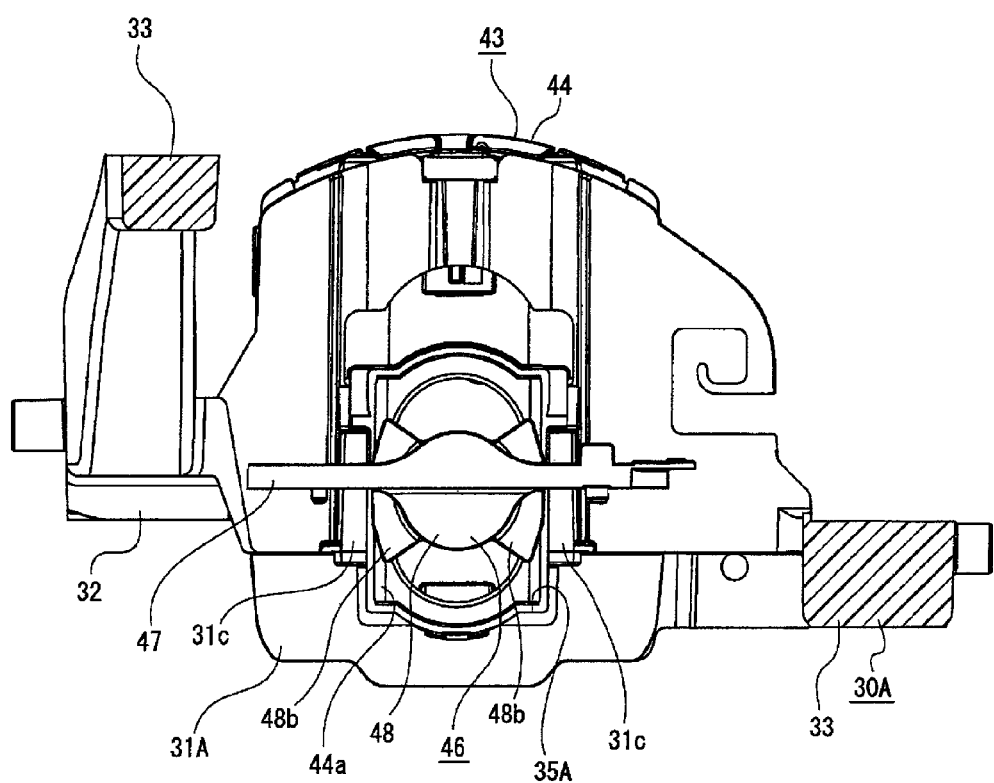
FIG. 14 is a plan view illustrating a joint, an actuator, and a portion of a frame in a state in which swinging of a lamp unit is not restricted.
Figure 15:
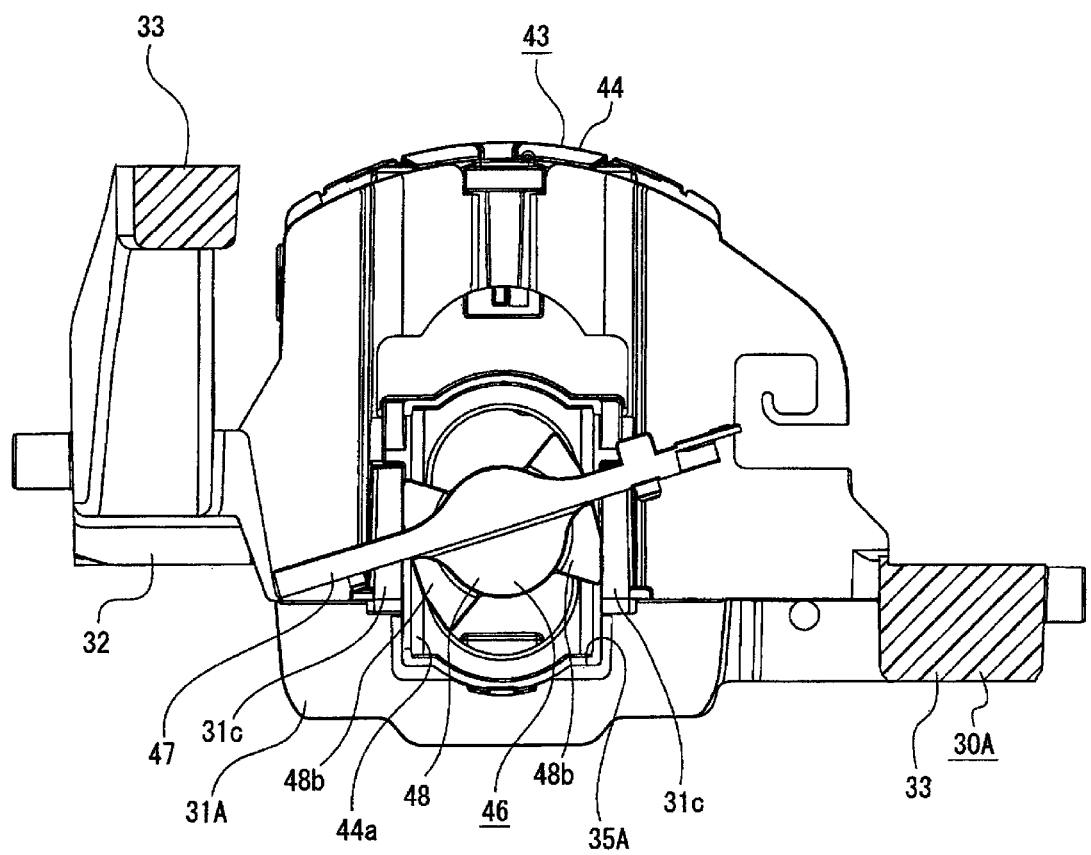
FIG. 15 is a plan view illustrating the joint, the actuator, and the portion of the frame in a state in which swinging of the lamp unit is restricted.

Within an appropriate swinging range of the lamp unit 7 in the swivel operation, the stoppers 31c, 31c provided to the actuator attachment portion 31A of the frame 30A are not contacted by the stopper-contact portions 48b, 48b of the joint 46A (see FIG. 14), and the lamp unit 7 swings smoothly. Note that FIG. 14 illustrates a state in which the lamp unit 7 is positioned substantially at the center of the swinging range.

When, for example, the lamp unit 7 swings further than the appropriate swinging range in a swivel operation due to vibration or the like during vehicle travel, at least one of the stopper-contact portions 48b, 48b contacts at least one of the stoppers 31c, 31c (see FIG. 15), restricting excessive swinging of the lamp unit 7.

When the drive shaft 45 moves in the front-rear direction, the lamp unit 7 and the joint 46A swing together as a unit about the pressed projection 29b of the supported portion 29 of the coupling member 16, in the up-down direction with respect to the frame 30A, thereby performing levelling adjustment to adjust the direction of the optical axis to the correct direction when the optical axis changes due to cargo or the like in the vehicle. When this is performed, the joint 46A swings as a unit with the lamp unit 7 about the swing shafts 45a, 45a with respect to the drive shaft 45.

In the above configuration provided with the frame 30A and the joint 46A, the stoppers 31c, 31c provided to the actuator attachment portion 31A are positioned to the outside of the insertion space 35A.

Accordingly, in a state in which the actuator 43 is detached from the actuator attachment portion 31A and the joint 46A is detached from the attachment plate 8, during downward removal of the unit configuration portions, particularly of the driver module 14, the stoppers 31c, 31c do not get in the way of the unit configuration portions being removed, enabling a smooth removal operation of unit configuration portions requiring replacement or repair.

In the above description, an example is given in which two each of the stoppers 31c, 31c and the stopper-contact portions 48b, 48b are respectively provided to the frame 30A and the joint 46A. However, configuration may be made in which a single stopper 31c and a single stopper-contact portion 48b are respectively provided to the frame 30A and the joint 46A.

There is no need to provide the stoppers 44b, 44b of the actuator 43 in a configuration provided with the frame 30A and the joint 46A.

What is claimed is:
1. A vehicle headlamp comprising:
a lamp unit including a light source and being disposed inside a lamp outer casing, the lamp outer casing including a lamp housing with an opening and a cover covering the opening of the lamp housing;
an actuator including a drive shaft and being configured to impart drive three to the lamp unit to swing the lamp unit and change an optical axis of the light source;
a joint including a coupling portion and being detachable from the lamp unit; and
an actuator attachment portion to which the actuator is detachably attached,
wherein the coupling portion is coupled to the drive shaft in a state in which the joint is attached to the lamp unit,
wherein the lamp unit comprises a driver module including a drive control circuit of the light source,
wherein the lamp unit is formed with a communication space which opens at least downward,
wherein the actuator attachment portion is formed in a frame shape including an insertion space pierced through in an up-down direction,
wherein the insertion space is below and in communication with the communication space, and
wherein the communication space and the insertion space are structured to allow the driver module to be removed downward through the communication space and the insertion space in a state in which the actuator has been detached from the actuator attachment portion and the joint has been detached from the lamp unit.

2. The vehicle headlamp according to claim 1, further comprising:
a frame including the actuator attachment portion,
wherein the frame is configured to support the lamp unit so as to he capable of swinging.

3. The vehicle headlamp according to claim 2, further comprising:
a radiator fan configured to rotate at least when the light source is being driven,
wherein the communication space and the insertion space are structured to allow the radiator fan to be removed downward through the communication space and the insertion space in the state in which the actuator has been detached from the actuator attachment portion and the joint has been detached from the lamp unit.

4. The vehicle headlamp according to claim 3, further comprising:
a support member configured to rotatably support the radiator fan and attached to the driver module.

5. The vehicle headlamp according to claim 2, wherein:
the joint and the lamp unit rotate together in accordance with rotation of the drive shaft,
the joint has a stopper-contact portion, and
the frame has a stopper positioned to the outside of the insertion space and configured to restrict rotation of the lamp unit by contacting the stopper-contact portion during rotation of the joint.

6. The vehicle headlamp according to claim 3, wherein:
the joint and the lamp unit rotate together in accordance with rotation of the drive shaft,
the joint has a stopper-contact portion, and
the frame has a stopper positioned to the outside of the insertion space and configured to restrict rotation of the lamp unit by contacting the stopper-contact portion during rotation of the joint.

7. The vehicle headlamp according to claim 4, wherein:
the joint and the lamp unit rotate together in accordance with rotation of the drive shaft,
the joint has a stopper-contact portion, and
the frame has a stopper positioned to the outside of the insertion space and configured to restrict rotation of the lamp unit by contacting the stopper-contact portion during rotation of the joint.

8. A vehicle headlamp comprising:
a lamp unit including a light source and being disposed inside a lamp outer casing, the lamp outer casing including a lamp housing with an opening and a cover covering the opening of the lamp housing;
an actuator including a drive shaft and being configured to impart drive force to the lamp unit to swing the lamp unit and change an optical axis of the light source;
a joint including a coupling portion and being detachable from the lamp unit; and
an actuator attachment portion to which the actuator is detachably attached,
wherein the coupling portion is coupled to the drive shaft in a state in which the joint is attached to the lamp unit,
wherein the lamp unit comprises a radiator fan configured to rotate at least when the light source is being driven,
wherein the lamp unit is formed with a communication space which opens at least downward,
wherein the actuator attachment portion is formed in a frame shape including an insertion space pierced through in an up-down direction,
wherein the insertion space is below and in communication with the communication space, and
wherein the communication space and the insertion space are structured to allow the radiator fan to be removed downward through the communication space and the insertion space in a state in which the actuator has been detached from the actuator attachment portion and the joint has been detached from the lamp unit.

9. The vehicle headlamp according to claim 1, wherein the communication space and the insertion space are structured to allow the joint to be removed downward through the communication space and the insertion space.

10. The vehicle headlamp according to claim 9, further comprising:
a frame including the actuator attachment portion,
wherein the frame is configured to support the lamp unit so as to be capable of swinging.

11. The vehicle headlamp according to claim 10, further comprising:
a driver module including a drive control circuit of the light source.

12. The vehicle headlamp according to claim 11, further comprising:
a support member configured to rotatably support the radiator fan and attached to the driver module.

13. The vehicle headlamp according to claim 10, wherein:
the joint and the lamp unit rotate together in accordance with rotation of the drive shaft,
the joint has a stopper-contact portion, and
the frame has a stopper positioned to the outside of the insertion space and configured to restrict, rotation of the lamp unit by contacting the stopper-contact portion during rotation of the joint.

14. The vehicle headlamp according to claim 11, wherein:
the joint and the lamp unit rotate together in accordance with rotation of the drive shaft,
the joint has a stopper-contact portion, and
the frame has a stopper positioned to the outside of the insertion space and configured to restrict rotation of the lamp unit by contacting the stopper-contact portion during rotation of the joint.

15. The vehicle headlamp according to claim 12, wherein:
the joint and the lamp unit rotate together in accordance with rotation of the drive shaft,
the joint has a stopper-contact portion, and
the frame has a stopper positioned to the outside of the insertion space and configured to restrict rotation of the lamp unit by contacting the stopper-contact portion during rotation of the joint.

16. The vehicle headlamp according to claim 9, wherein the communication space and the insertion space are structured to allow the joint to be removed downward through the communication space and the insertion space.

* * * * *

UNITED STATES PATENT AND TRADEMARK OFFICE
CERTIFICATE OF CORRECTION

PATENT NO. : 9,546,768 B2
APPLICATION NO. : 14/577939
DATED : January 17, 2017
INVENTOR(S) : Hiroyuki Kikuchi et al.

It is certified that error appears in the above-identified patent and that said Letters Patent is hereby corrected as shown below:

In the Claims

At Column 14, Claim number 1, Line number 47, "drive three" should read --drive force--.

Signed and Sealed this
Sixth Day of June, 2017

Michelle K. Lee
*Director of the United States Patent and Trademark Office*